(12) United States Patent
Tscherbner et al.

(10) Patent No.: US 8,876,211 B2
(45) Date of Patent: Nov. 4, 2014

(54) SEAT ASSEMBLY HAVING A GUIDE BUSHING

(75) Inventors: Achim Tscherbner, Ingolstadt (DE);
 Frank Kunert, Ingolstadt (DE);
 Michael Menges, Pliening (DE);
 Dhananjay Lachyan, Maharashtra (IN)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/697,594

(22) PCT Filed: Jun. 8, 2010

(86) PCT No.: PCT/US2010/037725
 § 371 (c)(1),
 (2), (4) Date: Nov. 13, 2012

(87) PCT Pub. No.: WO2011/155926
 PCT Pub. Date: Dec. 15, 2011

(65) Prior Publication Data
 US 2013/0069412 A1    Mar. 21, 2013

(51) Int. Cl.
 *A47C 7/36*  (2006.01)
 *A47C 1/10*  (2006.01)
 *A47C 7/38*  (2006.01)
 *B60N 2/48*  (2006.01)

(52) U.S. Cl.
 CPC .......... *A47C 7/38* (2013.01); *B60N 2/4814* (2013.01); *B60N 2/4823* (2013.01); *B60N 2/4826* (2013.01); *B60N 2002/4894* (2013.01)
 USPC ........ 297/410; 297/391; 403/326; 403/109.2; 403/109.3

(58) Field of Classification Search
 USPC ................ 297/391, 410, 463.1; 52/391, 410, 52/463.1; 403/104, 106, 109.1, 109.2, 403/109.3, 110, 326
 See application file for complete search history.

(56) References Cited

U.S. PATENT DOCUMENTS

| | | | |
|---|---|---|---|
| 5,156,440 A * | 10/1992 | Vidwans | 297/410 |
| 5,529,379 A * | 6/1996 | Stocker | 297/410 |
| 5,788,250 A | 8/1998 | Masters et al. | |
| 5,934,755 A * | 8/1999 | Halamish | 297/410 |
| 6,012,777 A * | 1/2000 | Wege et al. | 297/410 |
| 6,802,565 B2 * | 10/2004 | Isaacson | 297/410 |
| 7,108,327 B2 | 9/2006 | Locke et al. | |
| 7,255,401 B2 * | 8/2007 | Yokoyama et al. | 297/410 |
| 7,562,936 B1 * | 7/2009 | Veine et al. | 297/410 |
| 7,758,127 B2 * | 7/2010 | Bokelmann et al. | 297/410 |

(Continued)

FOREIGN PATENT DOCUMENTS

| | | |
|---|---|---|
| CN | 201021160 Y | 2/2008 |
| CN | 201099191 Y | 8/2008 |

(Continued)

OTHER PUBLICATIONS

First Office Action for the corresponding Chinese Patent Application No. 201080067060.5, mailed May 23, 2014.

*Primary Examiner* — Jeanette E Chapman
(74) *Attorney, Agent, or Firm* — Brooks Kushman P.C.

(57) ABSTRACT

A seat assembly having a guide bushing. The guide bushing has an opening for receiving a support post. First and second engagement features are provided that are configured to engage the support post. The first engagement feature is configured to flex in response to a biasing force exerted by a biasing member.

20 Claims, 3 Drawing Sheets

(56) References Cited

U.S. PATENT DOCUMENTS

| | | | |
|---|---|---|---|
| 8,297,705 B2 * | 10/2012 | Brunner et al. | 297/410 |
| 8,313,148 B2 * | 11/2012 | Lardies et al. | 297/410 |
| 2003/0222491 A1 * | 12/2003 | Isaacson | 297/410 |
| 2003/0222492 A1 * | 12/2003 | Nemoto et al. | 297/410 |
| 2004/0145228 A1 * | 7/2004 | Terrand et al. | 297/410 |
| 2006/0061188 A1 | 3/2006 | Locke et al. | |
| 2006/0197366 A1 | 9/2006 | Saberan | |
| 2009/0179474 A1 * | 7/2009 | Reel | 297/391 |

FOREIGN PATENT DOCUMENTS

| | | |
|---|---|---|
| DE | 19730911 A1 | 1/1999 |
| DE | 102005043811 A1 | 5/2006 |
| EP | 1123831 A1 | 8/2011 |
| JP | 62157844 A * | 7/1987 |
| WO | 2009027781 A1 | 3/2009 |

* cited by examiner

US 8,876,211 B2

SEAT ASSEMBLY HAVING A GUIDE BUSHING

CROSS-REFERENCE TO RELATED APPLICATION

This application is a U.S. national phase of PCT Appln. No. PCT/US2010/037725, filed Jun. 8, 2010, the disclosure of which is hereby incorporated by reference in its entirety.

BACKGROUND OF THE INVENTION

Field of the Invention

The present invention relates to a seat assembly having a guide bushing.

SUMMARY OF THE INVENTION

In at least one embodiment, a seat assembly is provided. The seat assembly includes a support post adapted to be mounted to a seat back and a guide bushing. The guide bushing includes a body, a first engagement feature, a second engagement feature, and a biasing member. The body defines an opening for receiving the support post. The first engagement feature is configured to flex and at least partially defines the opening. The biasing member exerts a biasing force on the first engagement feature to bias the first engagement feature toward the opening. The second engagement feature at least partially defines the opening and is spaced apart from the first engagement feature. The second engagement feature is not configured to flex with respect to the body.

In at least one embodiment, a seat assembly is provided. The seat assembly includes a head restraint assembly having a support post and a headrest moveably disposed on the support post. The headrest includes a traverse member and a first guide bushing. The traverse member is disposed in the headrest and has a first support post opening that receives the support post. The first guide bushing is disposed on the traverse member and includes an opening that receives the support post, first and second engagement features, and a biasing member. The first and second engagement features are disposed in the opening and engage the support post. The first engagement feature is configured to flex with respect to the opening. The biasing member is received in the first guide bushing and biases the first engagement feature toward the second engagement feature.

In at least one embodiment, a seat assembly is provided. The seat assembly includes a guide bushing having a body, a first engagement feature, a second engagement feature, and a spring. The body has an opening for receiving a support post. The first engagement feature is disposed in the opening and is configured to flex with respect to the body. The second engagement feature is disposed in the opening and is not configured to flex with respect to the body. The spring is disposed on the body and exerts a biasing force on the first engagement feature to bias the first engagement feature toward the second engagement feature.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
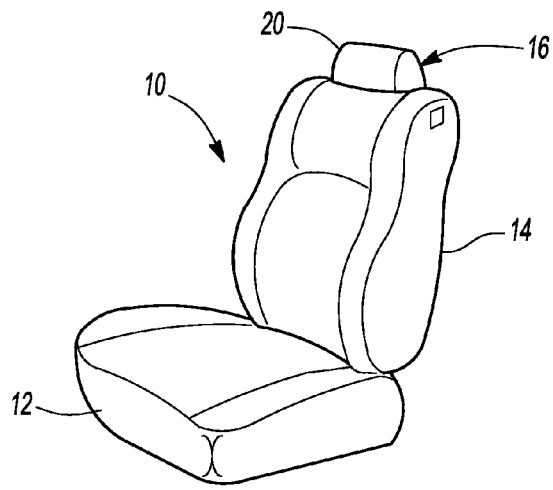
FIG. 1 is a perspective view of a seat assembly.

Referring to FIG. 1, an exemplary seat assembly 10 is shown. The seat assembly 10 may be configured for use in a vehicle, such as a motor vehicle like a car or truck or for non-automotive applications.

The seat assembly 10 may include a seat bottom 12 and a seat back 14. The seat bottom 12 may be configured to be mounted on a support surface, such as a floor pan of a vehicle. The seat back 14 may be pivotally disposed on the seat bottom 12 and may include a head restraint assembly 16.

Figure 2:
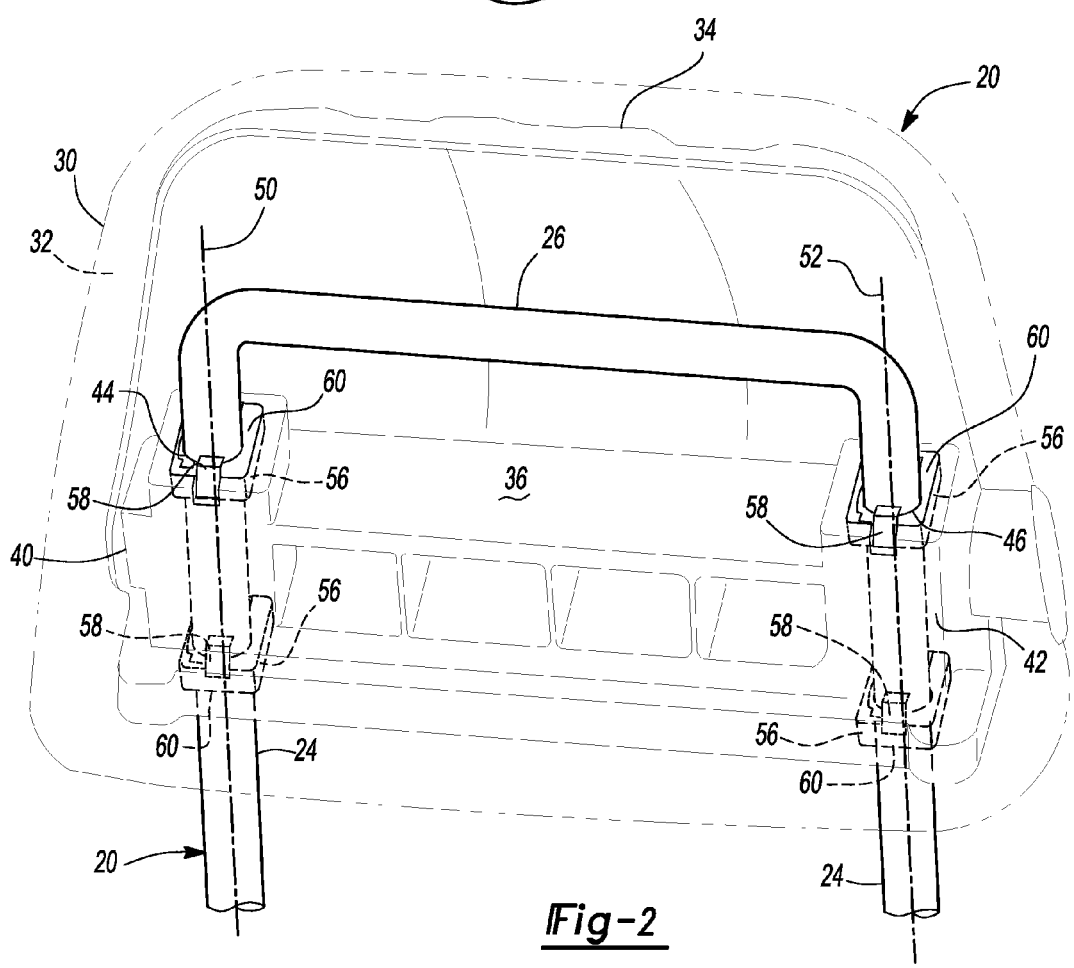
FIG. 2 is a perspective view of a head restraint assembly.

Referring to FIG. 2, the head restraint assembly 16 may include a headrest 20 and one or more support posts 22. In at least one embodiment, the headrest 20 may be moveably disposed on the support post 22. Alternatively, the headrest 20 may be fixedly disposed on the support post 22 and the support post 22 may move with respect to the seat back 14. The support post 22 may be made of any suitable material or materials, such as a metal like an aluminum or steel alloy.

The support post 22 may include one or more lower portions 24 and an upper portion 26. In at least one embodiment, the lower and upper portions 24, 26 may be generally cylindrical tubes. The lower portion 24 may extend through the top of the seat back 14 and may be provided in a substantially linear or non-linear configuration. The upper portion 26 may or may not extend at an angle from the lower portion 24. For example, the upper portion 26 may extend between and may be integrally formed with two lower portions 24 in one or more embodiments.

Referring to FIGS. 1 and 2, the headrest 20 may be configured to support the head of an occupant of the seat assembly 10. The headrest 20 may include a trim cover 30, a cushion 32, a housing 34, and a traverse member 36. For clarity, only a portion of the housing 34 is shown in FIG. 2.

The trim cover 30 may be provided on a visible exterior surface of the headrest 20. The trim cover 30 may be made of any suitable material or materials, such as a fabric, vinyl, leather, or the like. The trim cover 30 may cover the cushion 32, which may be disposed under at least a portion of the trim cover 30. The cushion 32 may be disposed proximate the housing 34, which may be provided to support the trim cover 30 and/or the cushion 32.

Referring to FIG. 2, the traverse member 36 may be provided with embodiments that have a headrest 20 that moves with respect to a support post 22. In such embodiments, the traverse member 36 may be disposed in or provided with the housing 34 and may be configured to move along the support post 22. The traverse member 36 may be disposed below the upper portion 26. As such, the upper portion 26 may limit the range of movement of the traverse member 36. The traverse member 36 may be made of any suitable material, such as a polymeric material.

The traverse member 36 may include a first end 40 and a second end 42 disposed opposite the first end 40. A first support post opening 44 may be disposed proximate the first end 40. A second support post opening 46 may be disposed proximate the second end 42. In at least one embodiment, the first and second support post openings 44, 46 may be disposed along first and second axes 50, 52. The first and second axes 50, 52 may be disposed substantially parallel to each other. The first and second support post openings 44, 46 may be generally cylindrical and may be spaced apart from the support post 22 in one or more embodiments.

The traverse member 36 may also include one or more recesses 56 and one or more retention features 58. A recess 56 may be configured to receive a guide bushing 60.

A recess 56 may be disposed proximate the first and/or second support post openings 44, 46. In the embodiment shown, four recesses 56 are provided, with a first pair of recesses 56 disposed proximate opposite ends of the first support post opening 44 and a second pair of recesses 56 being disposed proximate opposite ends of the second support post opening 46. The recesses 56 may be configured such that guide bushings 60 disposed at one end of the first and second support post openings 44, 46 may be disposed in a first plane and guide bushings 60 disposed at the opposite end of the first and second support post openings 44, 46 may be disposed in a second plane that may be substantially parallel to the first plane. Alternatively, a greater or lesser number of recesses 56 and/or guide bushings 60 may be provided. The recess 56 may be configured to inhibit rotation of the guide bushing 60.

A retention feature 58 may be provided to help hold the guide bushing 60 in an associated recess 56. The retention feature 58 may have any suitable configuration. For instance, a retention feature 58 may be configured as a clip or barb that may be integrally formed with the traverse member 36 and may be configured to flex to facilitate installation or removal of the guide bushing 60. The retention feature 58 may also be a separate fastener, such as a pin or screw, or an adhesive.

Figure 3:
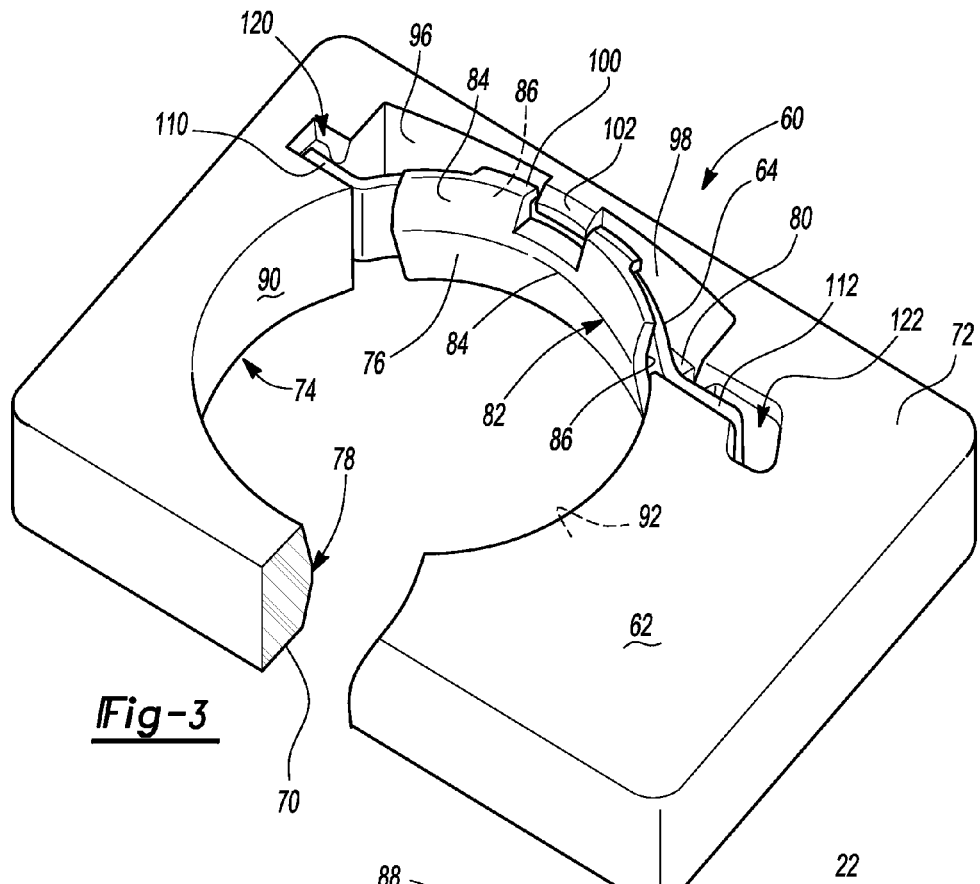
FIG. 3 is a perspective view of a guide bushing.
Figure 5:
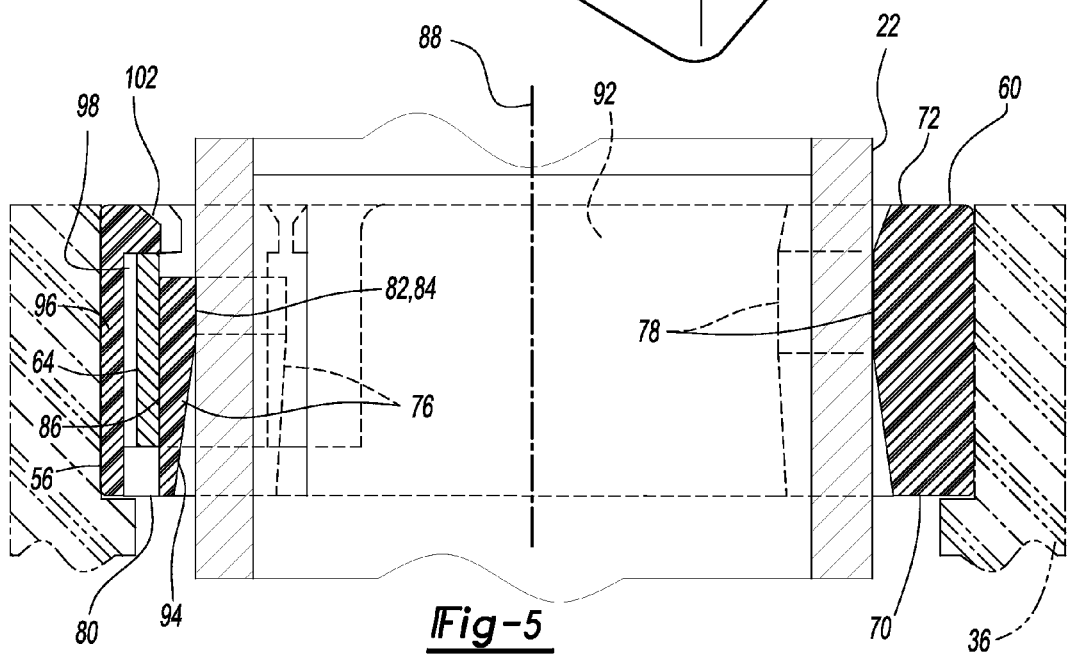
FIG. 5 is a section view of the guide bushing along section line 5-5.
Figure 4:
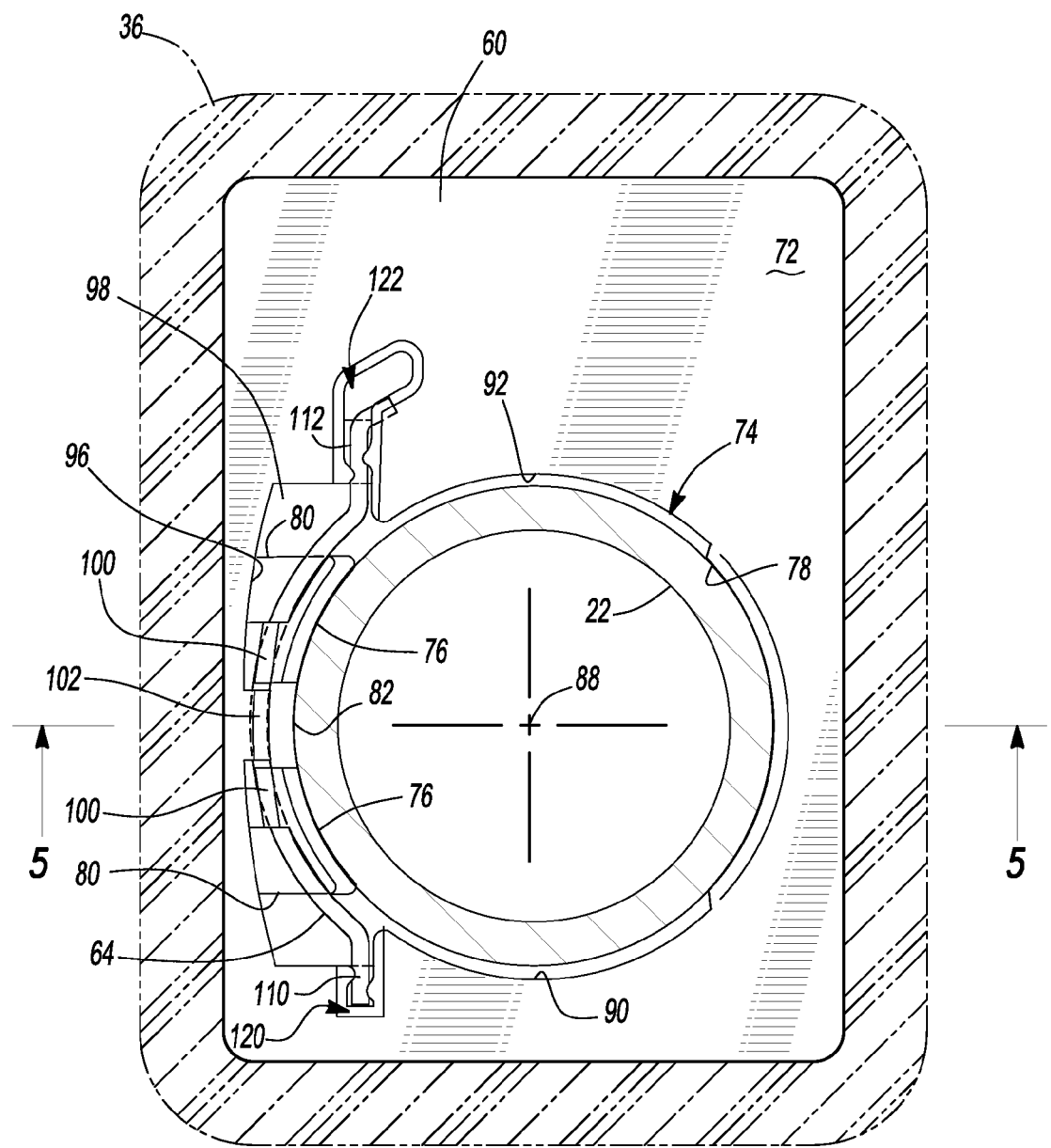
FIG. 4 is a top view of the guide bushing.

Referring to FIGS. 3-5, an exemplary guide bushing 60 is shown in more detail. The guide bushing 60 may be configured to engage and facilitate movement associated with a support post 22. For instance, the guide bushing 60 may facilitate movement of the headrest 20 with respect to the support post 22 when disposed in a headrest 20 and may facilitate movement of the support post 22 with respect to the seat back 14 when disposed in a seat back 14. The guide bushing 60 may include a body 62 and a biasing member 64.

The body 62 may be made of any suitable material, such as a polymeric material. In addition, the body 62 may be provided as a unitary component having a one piece construction. The body 62 may include a first body surface 70 and a second body surface 72 disposed opposite the first body surface 70. An opening 74 for receiving the support post 22 may extend from the first body surface 70 to the second body surface 72. The opening 74 may be at least partially defined by a first engagement feature 76 and a second engagement feature 78.

The first engagement feature 76 may be configured to flex with respect to the opening 74. In at least one embodiment, the first engagement feature 76 may include a support arm 80 and a contact portion 82.

The support arm 80 may extend from the body 62 toward the opening 74. The support arm 80 may be disposed adjacent to or be part of the first body surface 70.

The contact portion 82 may extend from the support arm 80. The contact portion 82 may extend from the first body surface 70 toward the second body surface 72. The contact portion 82 may include a first surface 84 that is configured to engage the support post 22 and a second surface 86 disposed opposite the first surface 84.

The first surface 84 may have a curved or arcuate configuration. For example, the first surface 84 may have a constant radius with respect to a center axis 88 of the opening 74. The center axis 88 may be an axis along which the support post 22 and/or headrest 20 moves. The first surface 84 may extend partially around the opening 74 and may extend further toward the center axis 88 than first and second clearance surfaces 90, 92 that may partially define the opening 74. As is best shown in FIG. 5, the first surface 84 may have a generally flat cross section and may include a ramp surface 94 that extends at an angle from the first surface 84 to facilitate installation of the support post 22 into the opening 74.

The second surface 86 may be spaced apart from an inner wall 96 of the body 62. As such, a slot or gap 98 may be formed that facilitates flexing of the first engagement feature 76.

One or more retention tabs 100 may be provided to help retain the biasing member 64. For example, a retention tab 100 may extend from the contact portion 82 away from the opening 74. A similar retention tab 102 may also be provided that extends generally from the inner wall 96 toward the opening 74 to help retain the biasing member 64. In the embodiment shown, the retention tab 102 may be disposed between a pair of retention tabs 100. One or more retention tabs 100, 102 may be omitted in various embodiments.

The second engagement feature 78 may be spaced apart from the first engagement feature 76. The second engagement feature 78 may be integrally formed with and may be fixedly positioned with respect to the body 62. As such, the second engagement feature 78 may be configured not to flex. The second engagement feature 78 may have a contact surface that is configured to engage the support post 22. The contact surface may have a curved or arcuate configuration and may have a constant radius with respect to a center axis 88 of the opening 74. In addition, the second engagement feature 78 may extend along a curve or arc for approximately the same distance or angle as the first engagement feature 76. The second engagement feature 78 may extend partially around the opening 74 and may extend further toward the center axis 88 than the first and second clearance surfaces 90, 92. As such, the first and second clearance surfaces 90, 92 may be spaced apart from the support post 22 to reduce friction therebetween. As is best shown in FIG. 5, the second engagement feature 78 may have a similar cross section as the first engagement feature 76.

The biasing member 64 may exert a biasing force on the first engagement feature 76. The biasing member 64 may have any suitable configuration. For instance, the biasing member 64 may be configured as a spring and may be made of any suitable material, such as a metal or a metal alloy. The biasing member 64 may engage the second surface 86 of the contact portion 82. The biasing member 64 may also include a first end 110 and a second end 112 disposed opposite the first end 110. The first and second ends 110, 112 may be disposed in the first and second retention slots 120, 122, respectively, that may be provided in the body 62. The retention slots 120, 122 may be configured to engage and retain the biasing member 64.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
 a support post adapted to be mounted to a seat back;
 a headrest moveably disposed on the support post; and
 a guide bushing disposed in the headrest, the guide bushing including:
  a body that defines an opening for receiving the support post;
  a first engagement feature that is configured to flex and at least partially defines the opening;
  a biasing member that exerts a biasing force on the first engagement feature to bias the first engagement feature toward the opening; and
  a second engagement feature that at least partially defines the opening and is spaced apart from the first engagement feature, wherein the second engagement feature is not configured to flex with respect to the body.

2. The seat assembly of claim 1 wherein the body includes a slot that receives the biasing member.

3. The seat assembly of claim 1 wherein the body includes a first body surface, a second body surface disposed opposite the first body surface, and a slot that extends from the first body surface toward the second body surface, wherein the biasing member is disposed within the slot between the first and second body surfaces.

4. The seat assembly of claim 1 wherein the first and second engagement features have first and second arcuate surfaces that engage the support post.

5. The seat assembly of claim 4 wherein the first and second arcuate surfaces have a substantially equal length.

6. The seat assembly of claim 1 wherein the headrest has a traverse member that has a first support post opening that receives the support post and wherein the guide bushing is disposed on the traverse member.

7. The seat assembly of claim 1 wherein the body includes a clearance surface that extends between the first and second engagement features and is spaced apart from the support post.

8. The seat assembly of claim 1 wherein the first and second engagement features include first and second engagement surfaces, respectively, such that the first and second engagement surfaces are the only two surfaces of the guide bushing that are configured to engage the support post.

9. A seat assembly comprising:
 a head restraint assembly having a support post and a headrest moveably disposed on the support post, the headrest including:
  a traverse member disposed in the headrest that has a first support post opening that receives the support post and a second support post opening spaced apart from the first support post opening; and
  a first guide bushing on the traverse member, the first guide bushing including:
   an opening that receives the support post;
   first and second engagement features disposed in the opening that are spaced apart from each other and engage the support post, the first engagement feature being configured to flex with respect to the opening; and
   a biasing member received in the first guide bushing that biases the first engagement feature toward the second engagement feature;
  a second guide bushing disposed proximate the second support post opening; and
  third and fourth guide bushings, wherein the first and third guide bushings are disposed along a first lower portion of the support post and the second and fourth guide bushings are disposed along a second lower portion of the support post.

10. The seat assembly of claim 9 wherein the traverse member includes a recess that receives the first guide bushing.

11. The seat assembly of claim 9 wherein the first and second guide bushings are disposed on the traverse member and are spaced apart from each other.

12. The seat assembly of claim 9 wherein the first and second guide bushings are disposed along a common axis.

13. The seat assembly of claim 9 wherein the third guide bushing has the same configuration as the fourth guide bushing.

14. The seat assembly of claim 9 wherein the third and fourth guide bushings are disposed on the traverse member.

15. The seat assembly of claim 9 wherein the third and fourth guide bushings are disposed substantially parallel to the first and second guide bushings.

16. A seat assembly comprising:
 a guide bushing including:
  a body that includes an opening for receiving a support post, an inner wall, and a first engagement feature that is disposed in the opening and is configured to flex with respect to the body, wherein the first engagement feature includes a support arm that extends from the body toward the opening and a contact portion that extends from the support arm such that a gap disposed between the inner wall and the contact portion;
  a second engagement feature disposed in the opening that is not configured to flex with respect to the body; and
  a spring disposed on the body that exerts a biasing force on the first engagement feature to bias the first engagement feature toward the second engagement feature, wherein the spring is disposed in the gap.

17. The seat assembly of claim 16 wherein the body includes a retention slot spaced apart from the first engagement feature, wherein an end of the spring is received in the retention slot.

18. The seat assembly of claim 16 further comprising a headrest, wherein the guide bushing is disposed in the headrest.

19. The seat assembly of claim 16 wherein the first engagement feature further comprises a retention tab that extends from the contact portion toward the inner wall for retaining the spring.

20. The seat assembly of claim 16 wherein the body includes a retention tab that extends toward the opening for retaining the spring.

* * * * *